(No Model.) 2 Sheets—Sheet 1.
O. RANEY.
SELF REGISTER FOR WEIGHING SCALES.
No. 523,546. Patented July 24, 1894.
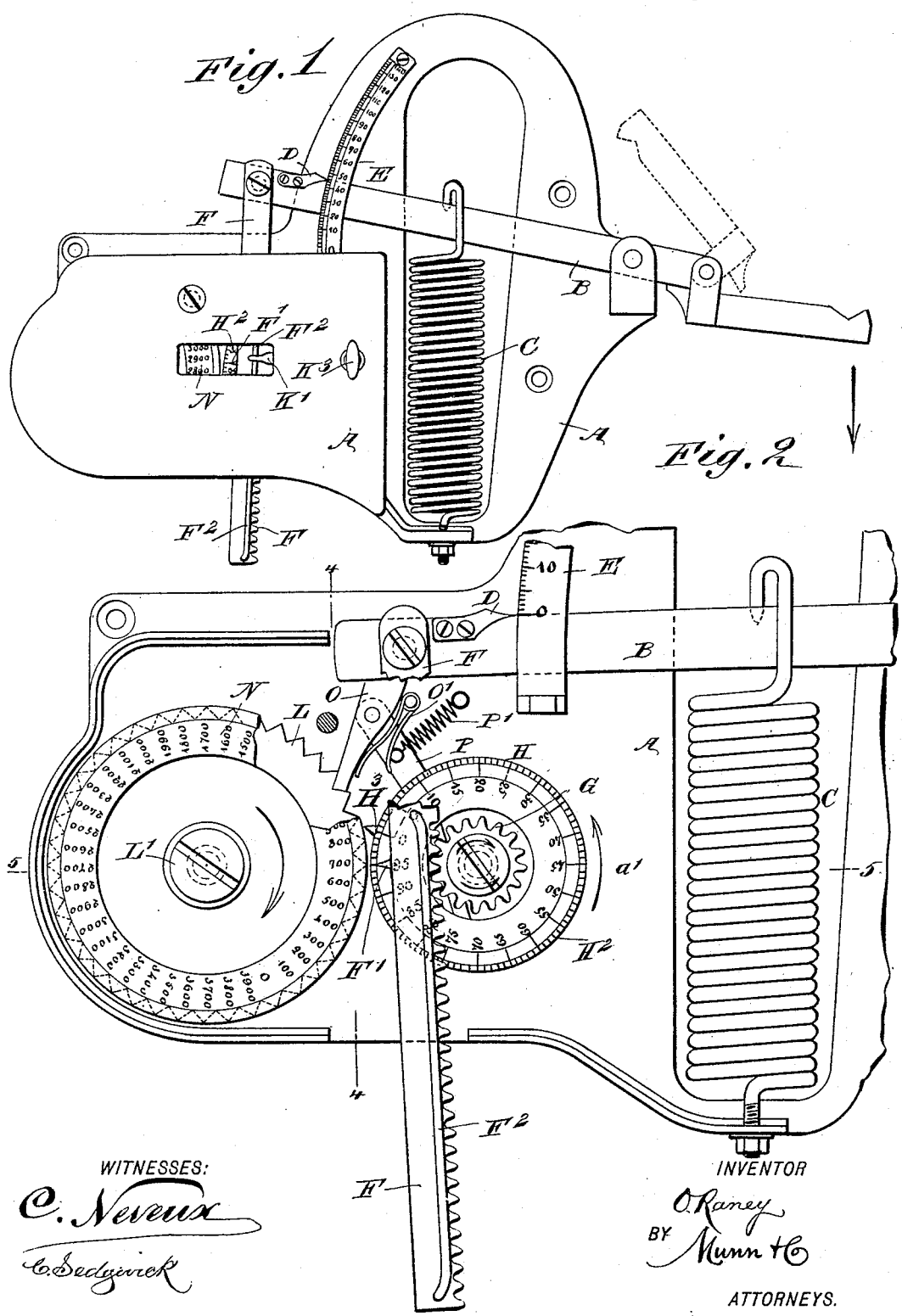

(No Model.) 2 Sheets—Sheet 2.
O. RANEY.
SELF REGISTER FOR WEIGHING SCALES.
No. 523,546. Patented July 24, 1894.
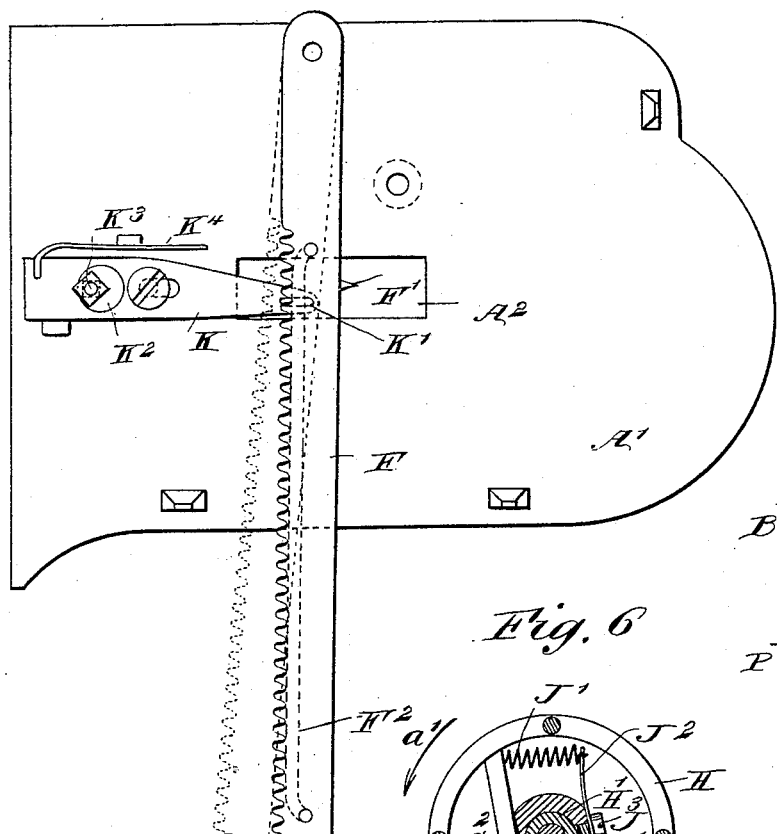
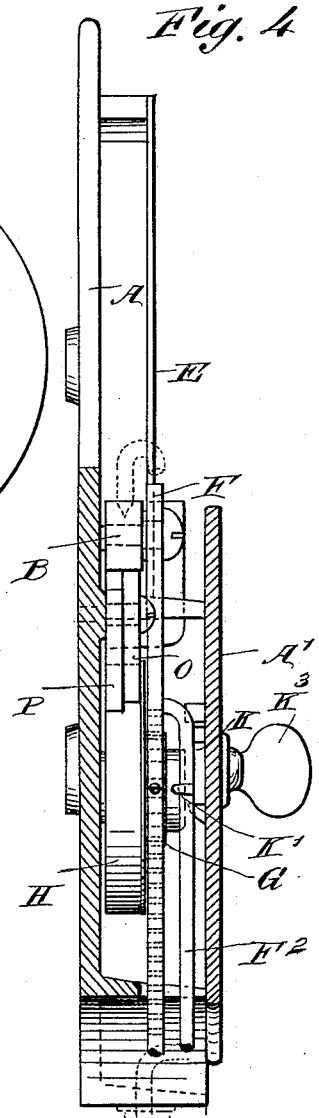
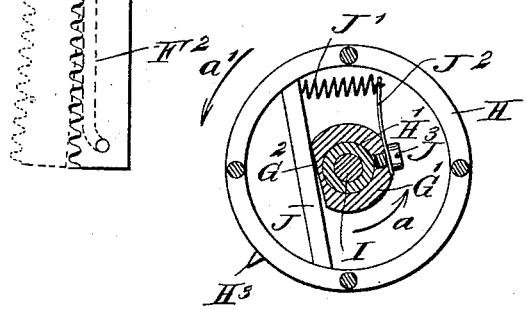
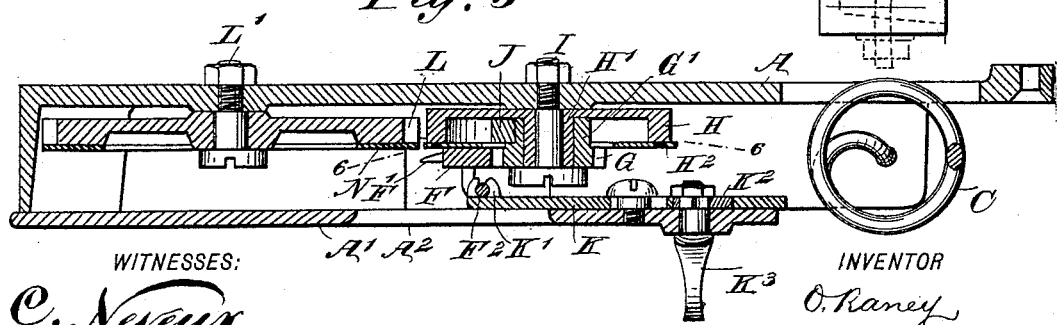
WITNESSES:
INVENTOR
O. Raney
BY
Munn & Co
ATTORNEYS.

UNITED STATES PATENT OFFICE.

OSCAR RANEY, OF TOPEKA, KANSAS.

SELF-REGISTER FOR WEIGHING-SCALES.

SPECIFICATION forming part of Letters Patent No. 523,516, dated July 24, 1894.

Application filed February 5, 1894. Serial No. 499,094. (No model.)

*To all whom it may concern:*

Be it known that I, OSCAR RANEY, of Topeka, in the county of Shawnee and State of Kansas, have invented a new and Improved Self-Register for Weighing-Scales, of which the following is a full, clear, and exact description.

The object of the invention is to provide a new and improved self-register for weighing scales, which is simple and durable in construction and arranged to automatically register the amounts weighed.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a face view of the improvement as applied on a spring scale. Fig. 2 is an enlarged face view of part of the improvement with the casing cover removed. Fig. 3 is a rear face view of the casing cover. Fig. 4 is a transverse section of the improvement on the line 4—4 of Fig. 2. Fig. 5 is a sectional plan view of the same on the line 5—5 of Fig. 2; and Fig. 6 is a sectional front view of part of the improvement on the line 6—6 of Fig. 5.

The improved self-register, as shown in the drawings, is applied to a spring scale of any approved construction, but it is evident that the improvement may readily be adapted to lever and other scales.

The scale is provided with a frame A on which is fulcrumed the scale beam B pressed on by a spring C and provided with a pointer D indicating the amount weighed on the beam on a suitable indicating scale E, as plainly shown in Fig. 1.

On the rear end of the scale beam B is pivoted a downwardly-extending rack F adapted to engage a pinion G mounted to turn loosely on the hub H' of an indicating wheel H mounted to rotate loosely on a stud I secured on the frame A. On the front face of the indicating wheel H is arranged a dial $H^2$ indicating one hundred pounds and sub-divisions, as plainly shown in Fig. 2.

The pinion G is connected by a pawl mechanism with the indicating wheel H, the said mechanism being shown in detail in Figs. 5 and 6. The pawl J is fitted loosely within the inner surface of the rim of the indicating wheel H and rests loosely against a flattened side $G^2$ of the hub G' of the pinion G. One end of the pawl J is connected by a spring J' with a spring arm $J^2$, fastened by a set screw $J^3$ to the hub G' of the pinion.

Now, it will be seen that when the scale beam B is loaded its rear end swings upward, so as to draw the rack F in the same direction, whereby a rotary motion is given to the pinion G in the inverse direction of the arrows $a'$, shown in Figs. 2 and 6. During this movement, the spring J' holds the end of the pawl J out of contact with the inner surface of the rim of the wheel H, so that the latter remains at a standstill during the movement of the pinion G in the direction indicated. When, however, the rear end of the scale beam B swings downward on the removal of the load at the front end of the beam then the downwardly moving rack F imparts a rotary motion to the pinion G in the direction of the arrow $a'$, so that the other end of the pawl J is held in engagement with the inner surface of the rim of the wheel H, whereby the latter is carried along and rotates on the stud I in the direction of the arrow $a'$.

On the rack F is arranged a pointer F' adapted to indicate on the graduation of the dial $H^2$, so that when the scale beam B comes to rest, the said pointer F' indicates on the graduation of the dial $H^2$, the amount weighed. On a subsequent weighing of a load, the above described operation is repeated, that is, on the upward movement of the rack F the indicating wheel H remains at a standstill and the pointer F' is moved out of position over the previous figure on the dial $H^2$, and on the downward movement of the said rack, the indicating wheel H is turned a distance corresponding to the amount weighed, so that the pointer F' now indicates as soon as the beam B comes to a rest, the total amount of the two loads.

When it is desired not to register the loads weighed, then the rack F is thrown out of mesh with the pinion G and for this purpose the said rack F is provided with a guide arm $F^2$ engaged by a guide K', see Fig. 5, formed on the inner face of a bolt K fitted to slide on the inside of the cover A' for the register and secured on the frame A. An eccentric K² engages the bolt K and the eccentric is fastened on a key K³ mounted to turn in suitable bearings in the cover A', as plainly illustrated in Fig. 5. The bolt K is restrained from moving laterally by a detent K⁴ as shown in Fig. 3.

The front end of the key K³ is adapted to be taken hold of by the operator, so that in turning the key, the eccentric K² is caused to slide the bolt K inward so that the guide K' acting on the guide arm F², imparts a swinging motion to the rack F to the left to move the said rack out of mesh with the pinion G. When it is desired to register, then the key K³ is turned in the opposite direction, so as to move the bolt K to the right and to again move the rack F in mesh with the pinion G. Now, in order to register more than one hundred pounds, indicated by the wheel H, I provide the latter at its 0 point with a tooth H³ to engage a ratchet wheel L mounted to rotate loosely on a stud L' secured to the frame A. On the front face of this ratchet wheel L is secured a dial N indicating hundreds and thousands up to four thousand, as shown in Fig. 2. Each revolution of the indicating wheel H causes a turning of the wheel N, the distance between two teeth, so that an additional one hundred is indicated on each revolution of the indicating wheel H.

It is understood that the pointer F' indicates on the dial N, so that the operator can at once read the total amount registered from both dials N and H² through the opening A² in the cover A'. As shown in Fig. 2, for instance, the total amount registered is 795. In order to prevent a return movement of the ratchet wheel L, I provide a pawl O pivoted on the casing and engaging the teeth of the ratchet wheel N, the said pawl being held in contact with the teeth by a suitable spring O'. In order to prevent a return movement of the indicating wheel H, I provide a friction pawl P fulcrumed on the same pivot as the pawl O and pressed on by a spring P', so as to hold the free end of the said pawl P in frictional contact with the peripheral surface of the rim of the wheel H.

Having thus fully described my invention, I claim as new and desire to secure by Letters Patent—

1. A self-registering weighing scale, comprising a fixed frame, a pivoted beam, a spring holding the same in normal position, a rack-bar pivoted to said beam, a rotatable toothed wheel with which the rack-bar engages, a dial indicating wheel mounted on the same axis as the toothed wheel, and a pawl mechanism for connecting said wheels when the toothed one rotates in one direction, but which leaves them disconnected when rotating in the opposite direction, as shown and described.

2. A self-register for weighing scales, comprising a pivoted scale beam, and spring for retracting the same after being tilted a rack adapted to be operated by the scale beam, a pinion in mesh with the said rack, an indicating wheel on which rotates loosely the said pinion, the said indicating wheel being provided with a dial, and a pawl arranged within the said indicating wheel and carried by yielding connection from the said pinion, substantially as shown and described.

3. A self-register for weighing scales, comprising a pivoted scale beam, and spring for retracting the same after being tilted a rack adapted to be operated by the scale beam, a pinion in mesh with the said rack, an indicating wheel on which rotates loosely the said pinion, the said indicating wheel being provided with a dial, a pawl arranged within the said indicating wheel and carried by yielding connection from the said pinion, and a spring pressed friction pawl engaging the said indicating wheel to prevent the return movement thereof, substantially as shown and described.

4. A self-register for weighing scales, comprising a rack pivoted on the scale beam, a pinion adapted to be engaged by the said rack, an indicating wheel on which indicates a pointer on the said rack, a pawl mechanism for rotating the said indicating wheel from the said pinion, a ratchet wheel adapted to be engaged by a tooth on the said indicating wheel, and a hundreds dial held on the said ratchet wheel, substantially as shown and described.

5. A self-register for weighing scales, comprising a rack pivoted on the scale beam and provided with a guide bar, a pinion adapted to be engaged by the said rack, a bolt engaging the said guide bar, and means, substantially as described, for operating the said bolt to move the said rack in and out of mesh with the said pinion, substantially as shown and described.

OSCAR RANEY.

Witnesses:
THOMAS P. LISVILLE,
EDWARD H. KEACH.